United States Patent
Bermudez Rodriguez et al.

(10) Patent No.: US 10,251,348 B2
(45) Date of Patent: Apr. 9, 2019

(54) DOUBLE DRIP LINE VARIABLE RATE WATER DISTRIBUTION

(71) Applicant: International Business Machines Corporation, Armonk, NY (US)

(72) Inventors: Sergio A. Bermudez Rodriguez, Boston, MA (US); Nigel C. P. Hinds, Great Barrington, MA (US); Levente Klein, Tuckahoe, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/562,821

(22) Filed: Dec. 8, 2014

(65) Prior Publication Data
US 2016/0157444 A1    Jun. 9, 2016

(51) Int. Cl.
*B05B 15/00* (2018.01)
*A01G 25/16* (2006.01)
*A01G 25/02* (2006.01)

(52) U.S. Cl.
CPC ......... *A01G 25/165* (2013.01); *A01G 25/023* (2013.01); *A01G 25/16* (2013.01)

(58) Field of Classification Search
CPC ..... A01G 25/023; A01G 25/16; A01G 25/162
USPC ...... 239/542, 569, 515, 547; 137/1, 8, 9, 13, 137/803–842, 89, 98–101.21
See application file for complete search history.

(56) References Cited

U.S. PATENT DOCUMENTS

| | | | |
|---|---|---|---|
| 3,767,124 A | 10/1973 | Spencer | |
| 4,194,691 A | 3/1980 | Bimbach et al. | |
| 4,209,131 A | 6/1980 | Barash et al. | |
| 4,878,781 A | 11/1989 | Gregory et al. | |
| 4,930,934 A | 6/1990 | Adkins | |
| 5,054,690 A | 10/1991 | Olson | |
| 5,133,622 A | 7/1992 | Hewlett | |
| 5,228,469 A | 7/1993 | Otten et al. | |
| 5,246,164 A * | 9/1993 | McCann | A01B 79/005 239/11 |
| 5,337,957 A | 8/1994 | Olson | |
| 5,350,251 A | 9/1994 | Daniel | |
| 5,678,771 A * | 10/1997 | Chapman | A01G 25/092 239/727 |
| 5,711,482 A | 1/1998 | Yu | |
| 5,772,114 A * | 6/1998 | Hunter | A01M 7/0089 239/170 |
| 5,829,678 A | 11/1998 | Hunter et al. | |

(Continued)

OTHER PUBLICATIONS

Coates et al., "Precision Irrigation in Orchards: Development of a Spatially Variable Microsprinkler System," Information and Technology for Sustainable Fruit and Vegetable Production, FRUTIC '05, Sep. 12-16, 2005, Montpellier, France, pp. 611-624.

(Continued)

*Primary Examiner* — Steven J Ganey
(74) *Attorney, Agent, or Firm* — Robert C. Bunker (57) ABSTRACT

Embodiments of the present invention provide systems and methods for a variable rate water distribution system. Embodiments of the present invention can afford users with the ability to variably deliver water to portions of the variable rate water distribution system. Furthermore, embodiments of the present invention provide users with the ability to flush portions of the variable rate water distribution system.

14 Claims, 9 Drawing Sheets

(56) References Cited

U.S. PATENT DOCUMENTS

| | | | |
|---|---|---|---|
| 6,085,986 A | 7/2000 | Yu | |
| 6,230,091 B1* | 5/2001 | McQuinn | A01B 79/005 239/159 |
| 6,240,336 B1 | 5/2001 | Brundisini | |
| 6,314,979 B1 | 11/2001 | Lips | |
| 6,464,152 B1 | 10/2002 | Bolinis et al. | |
| 6,540,158 B1 | 4/2003 | Vered | |
| 6,558,078 B2 | 5/2003 | Sowry et al. | |
| 6,694,195 B1 | 2/2004 | Garcia | |
| 7,108,205 B1 | 9/2006 | Hashimshony et al. | |
| 7,899,580 B2 | 3/2011 | Cardinal et al. | |
| 7,930,069 B2 | 4/2011 | Savelle, Jr. et al. | |
| 8,160,750 B2 | 4/2012 | Weiler | |
| 8,443,822 B2 | 5/2013 | Ivans | |
| 9,173,353 B2 | 11/2015 | Hamann et al. | |
| 9,693,511 B2 | 7/2017 | Bermudez Rodriguez et al. | |
| 2004/0222325 A1 | 11/2004 | Regev | |
| 2005/0121536 A1 | 6/2005 | Bavel | |
| 2006/0131442 A1 | 6/2006 | Ivans | |
| 2006/0293797 A1* | 12/2006 | Weiler | A01G 25/16 700/284 |
| 2007/0189852 A1 | 8/2007 | Wolfley | |
| 2008/0087749 A1* | 4/2008 | Ruskin | A01G 25/165 239/542 |
| 2008/0135647 A1* | 6/2008 | France | A01G 27/005 239/542 |
| 2009/0134242 A1* | 5/2009 | Theoret | A01G 9/247 239/201 |
| 2011/0169630 A1* | 7/2011 | Nolfi | F01D 17/02 340/539.1 |
| 2012/0037729 A1* | 2/2012 | Lee | F16K 31/0675 239/569 |
| 2013/0060389 A1 | 3/2013 | Marsters et al. | |
| 2013/0074400 A1* | 3/2013 | Roess | A01G 25/06 47/21.1 |
| 2013/0192678 A1* | 8/2013 | Hammonds | G01F 3/16 137/1 |
| 2013/0320106 A1 | 12/2013 | Schmidt | |
| 2014/0252112 A1 | 9/2014 | Hamann et al. | |
| 2014/0252113 A1* | 9/2014 | Hamann | A01G 25/02 239/11 |
| 2015/0367357 A1* | 12/2015 | Humpal | B05B 1/30 239/1 |

OTHER PUBLICATIONS

Coates et al., "Control of individual microsprinklers and fault detection strategies," Precision Agriculture, vol. 7, No. 2, 2006, published online: Apr. 7, 2006, pp. 85-99, © Springer Science+Business Media, LLC 2006, DOI 10.1007/s11119-006-9001-1.

Coates et al., "Design of a System for Individual Microsprinkler Control," Transactions of the ASABE, vol. 49, No. 6, 2006, pp. 1963-1970.

Coates et al., "Wireless Network for Individual Emitter Control in Irrigation," VDI Berichte, vol. 1958, 2006, pp. 214-209.

Hamann et al., "Irrigation System," U.S. Appl. No. 13/792,751, filed Mar. 11, 2013.

* cited by examiner

DOUBLE DRIP LINE VARIABLE RATE WATER DISTRIBUTION

FIELD OF THE INVENTION

The present invention relates generally to the field of water distribution systems, and more particularly to double drip line variable rate water distribution systems.

BACKGROUND OF THE INVENTION

An automated water distribution system capable of automated monitoring, differential distribution, and performing remote flushing operations enables an administrative user of a piping network to deliver water throughout the system in a controlled manner and flush components. The distribution system may operate in large spatial areas with thousands of valves arranged in complex networks (e.g., building piping infrastructures, hothouses, garden centers, agricultural lands, etc.).

One such implementation is variable rate water distribution systems which enable differential watering of crops for agricultural lands. For example, rarely are soil properties and crops (e.g., soil water holding capacity, types of crops, etc.) uniform throughout an entire target water distribution area. Variable rate water distribution systems address the dynamic water demands of different soils and crops by delivering a variable amount of water to different portions of the target water distribution area.

SUMMARY

Embodiments of the present invention provide systems and methods for a water distribution system. In one embodiment, the system is provided comprising a plurality of water distribution segments coupled to each other, each water distribution segment comprising: a supply line having a proximal end and a distal end; an emitting line having a proximal end and a distal end, the emitting line having a plurality of emitters disposed therein; a water distribution valve comprising one input and two outputs; and a joint element comprising two inputs and one output, wherein one output of the water distribution valve is coupled to the proximal end of the supply line, one output of the water distribution valve is coupled to the proximal end of the emitter line, one input of the joint element is coupled to the distal end of the supply line, one input of the joint element is coupled to the distal end of the emitter line, wherein each water distribution valve is configured to divert liquid through either the supply line or the emitting line to which the water distribution valve is coupled.

DETAILED DESCRIPTION

Embodiments of the present invention recognize that water distribution systems for irrigation systems typically require an on-demand delivery of water and/or nutrients at every location throughout a target water distribution area. Typically, water distribution systems are capable of delivering a uniform amount of water to emit through water distribution segments. Furthermore, the amount of delivered water is based on target water distribution area properties (e.g., soil moisture content, crop properties, soil water capacity, etc.). As a result, excessive water may accumulate in certain sections of the target water distribution area, and a non-sufficient amount of water may be delivered to other sections of the target water distribution area. Embodiments of the present invention provide systems, methods, and computer program products for variable rate water distribution of target water distribution areas. Embodiments of the present invention enable delivery of a variable amount of liquid (e.g., water and/or fertilizers) to target water distribution areas, and further provide the ability to efficiently flush variable water distribution systems.

Figure 1:
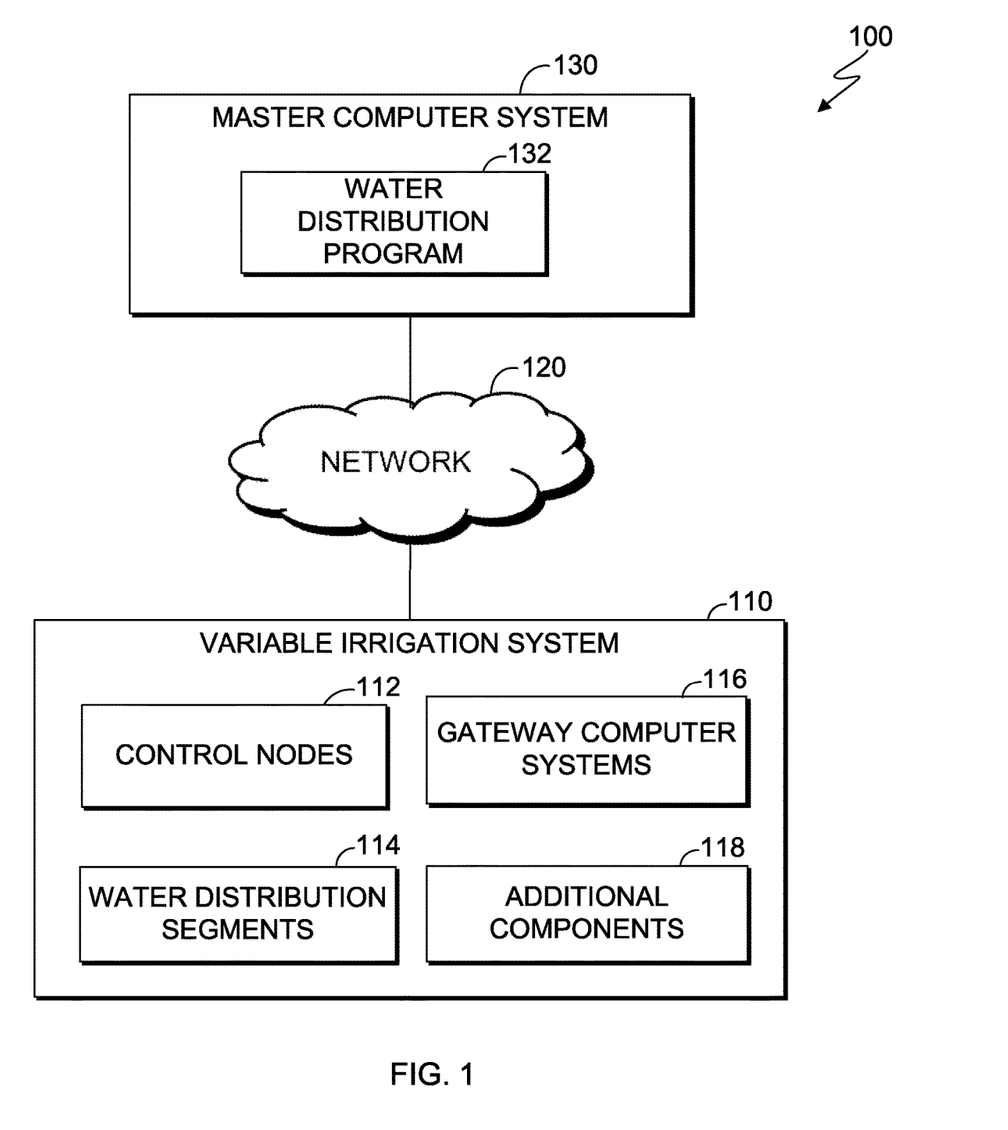
FIG. 1 is a block diagram of a variable water distribution environment, in accordance with an embodiment of the present invention.

FIG. 1 is a functional block diagram of water distribution environment 100, in accordance with an embodiment of the present invention. In this embodiment, water distribution environment 100 is an irrigation system. In other embodiments, water distribution environment 100 is a piping network for a building. In general, water distribution environment 100 can be any piping network capable of distributing liquid from a liquid source to one or more target distribution areas. Water distribution environment 100 includes master computer system 130 and gateway computer systems 116 of variable water distribution system 110, which are interconnected by network 120. Gateway computer systems 116 and master computer system 130 can be desktop computers, laptop computers, specialized computer servers, or any other computer systems known in the art. In certain embodiments, gateway computer systems 116 and master computer system 130 represent computer systems utilizing clustered computers and components to act as a single pool of seamless resources when accessed through network 120. In other embodiments, gateway computer systems 116 and master computer system 130 represent virtual machines. In general, gateway computer systems 116 and master computer system 130 are representative of any electronic devices, or combination of electronic devices, capable of executing machine-readable program instructions, as discussed in greater detail with regard to FIG. 9.

Master computer system 130 includes water distribution program 132. Water distribution program 132 issues a water distribution schedule to variable water distribution system 110 and receives flow response feedback information (e.g., data indicating compliance with water distribution schedules and/or any discrepancies such as pressure measurements, flow measurements, etc.) from variable water distribution system 110 via network 120. Water distribution program 132 can analyze discrepancies between a water distribution schedule and flow response feedback information. Furthermore, water distribution program 132 can transmit instructions for various water distribution operations for variable water distribution system 110 (e.g., may include operations for flushing systems, performing remote diagnostics, executing a new water distribution schedule, etc.).

Variable water distribution system 110 comprises control nodes 112, gateway computer systems 116, water distribution segments 114, and additional components 118. Variable water distribution system 110 delivers water to target water distribution areas. The term "target water distribution areas", as used herein, refers to desired areas for water distribution during the operation of variable water distribution system 110.

Gateway computer systems 116 are computer systems that receive water distribution schedules from water distribution program 132 and transmit water distribution schedules to one or more control nodes 112. In this embodiment, gateway computer systems 116 are configured as intermediary computer systems.

Water distribution segments 114 transport and irrigate water to the target water distribution areas and are deployed throughout variable water distribution system 110. Each one of water distribution segments 114 comprises an emitting line and a supply line. The emitting line is a conduit (e.g., flexible or rigid tubes, pipes, etc.) through which liquids can be transported. The emitting line comprises emitters that are merged, attached, or otherwise operatively connected to the emitting line to deliver a controlled amount water to the target water distribution areas. The emitters are capable of dispensing various liquids (e.g., water and/or fertilizers) and may comprise, for example, holes or nozzles disposed along the length of the emitting line on each of water distribution segments 114. In this embodiment, the supply line is parallel to the emitting line and disposed above the emitting line. The supply line is also a conduit through which liquids can be transported. In this embodiment of the present invention, the emitting line and supply line are operatively connected by one or more additional components 118, as discussed in greater detail with regard to FIGS. 4A-4C and FIG. 5.

Control nodes 112 receive and execute instructions from gateway computers systems 116 to actuate (i.e., open and close) water distribution valves of water distribution segments 114. Control nodes 112 also receive flow response feedback information from additional components 118 and transmit that feedback data to gateway computer systems 116. In this embodiment, each of control nodes 112 comprises one or more electronic circuits (e.g., a microcontroller or other computer system) operatively connected with a water distribution valve, and one or more additional components 118. The electronic circuit of each control nodes 112 may also be operatively connected with other components, such as a control panel to facilitate input of control information. Control nodes 112 can electromechanically operate water distribution valves of water distribution segments 114.

Control nodes 112 can be operatively connected to one or more other control nodes 112 to relay or propagate data. For example, as discussed in greater detail with regard to FIG. 2, control nodes 112 may be operatively connected to one another in series and/or in parallel to relay data to and from gateway computer systems 116. In general, control nodes 112 may use any wired or wireless networking technologies known in the art (e.g., mesh, series/parallel, etc.) to facilitate data transfer with other control nodes 112 to and from gateway computer systems 116.

Additional components 118 collectively represent other components of variable water distribution system 110 that comprise the infrastructure of variable water distribution system 110 and otherwise facilitate operation thereof. For example, additional components 118 comprise connectors, valves and miscellaneous conduits not specifically discussed herein. Additional components 118 may also include any component that facilitates monitoring the variable water distribution system 110 (e.g., pressure sensors, flow sensors, soil moisture sensors, etc.).

Figure 2:
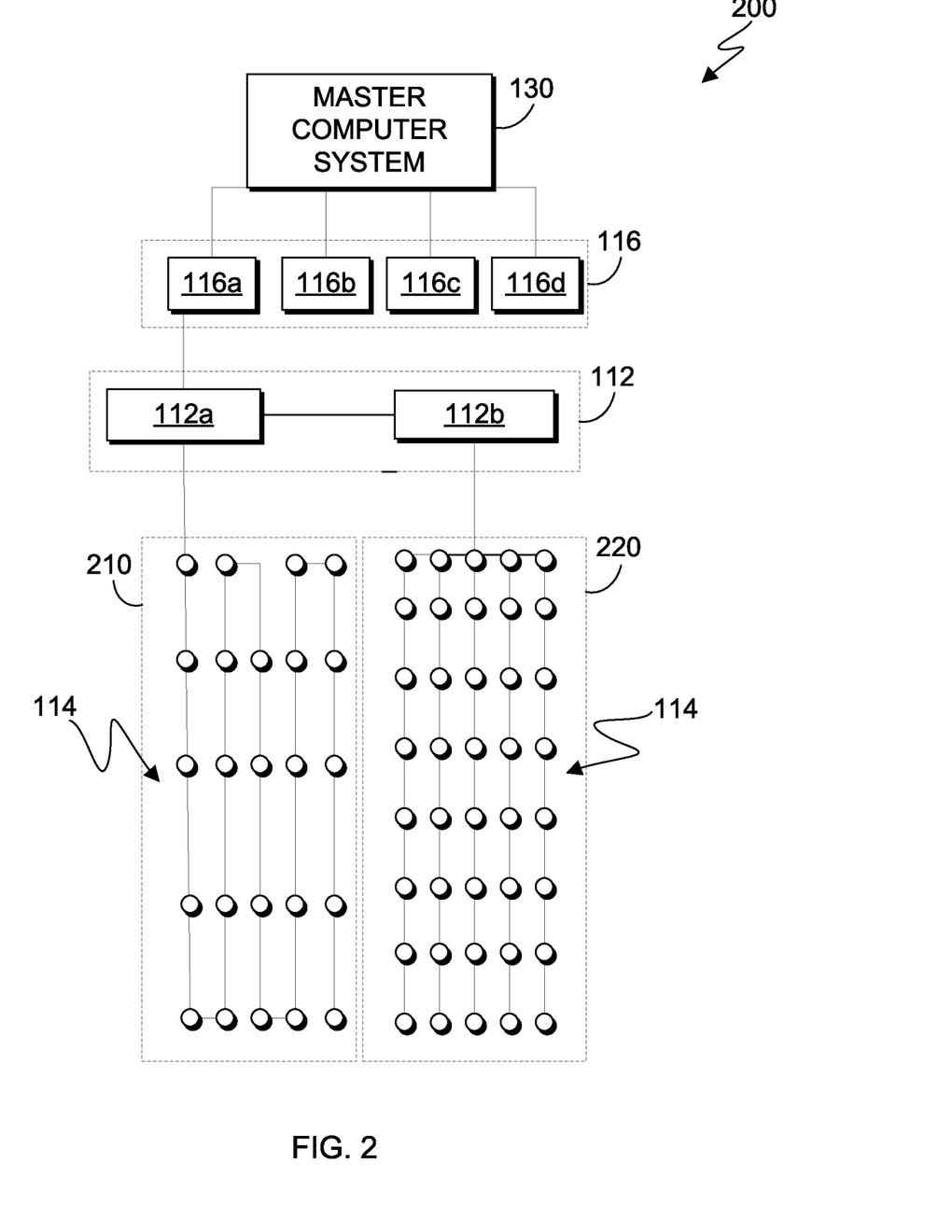
FIG. 2 is a diagram of a hierarchy of the water distribution environment of FIG. 1, in accordance with an embodiment of the present invention.

FIG. 2 is a diagram of hierarchy 200 of water distribution environment 100, in accordance with an embodiment of the present invention. It should be appreciated that FIG. 2 provides only an illustration of one implementation, and does not imply any limitations with regard to hierarchical structures and/or hierarchal environments for in which different embodiments may be implemented. In this embodiment, hierarchy 200 comprises a master computer system 130, gateway computer systems 116 (i.e., gateway computer systems 116a, 116b, 116c, and 116d), control nodes 112 (i.e., control nodes 112a and 112b), water distribution zone 210 and water distribution zone 220, and a plurality of water distribution segments 114. In this embodiment, control node 112a is associated with water distribution zone 210 and is operatively connected to each one of water distribution segments 114 within water distribution zone 210. Control node 112b is associated with water distribution zone 220 and is operatively connected to each one of water distribution segments 114 associated with water distribution zone 220. The term "water distribution zone", as used herein, refers to a grouping of water distribution segments 114 operatively connected to one or more additional components 118 (valves, pressure sensors, flow meters, etc.) for a particular target water distribution area, all of which are controlled by one of control nodes 112. In this embodiment, master computer system 130 is operatively connected to gateway computer system 116. In turn, gateway computer system 116 is operatively connected to control nodes 112. In turn, control nodes 112 are operatively connected to water distribution zone 210 and water distribution zone 220.

Control nodes 112 comprise control node 112a and control node 112b, in accordance with an embodiment of the present invention. In other embodiments of the present invention, variable water distribution system 110 comprises any number of control nodes. In this embodiment of the present invention, control node 112a and control node 112b are operatively connected with gateway computer system 116a. Accordingly, control node 112a propagates command logic to control node 112b once control node 112a receives command logic from gateway computer system 116a. Flow response feedback information from the plurality of water distribution segments 114 for water distribution zone 220 will propagate from control node 112b to control node 112a and then to gateway computer system 116a.

Upon receiving a water distribution schedule from master computer system 130, as will be discussed in greater detail with regard to FIG. 6, gateway computer system 116a can control water distribution segments 114 within water distribution zone 210 and water distribution zone 220 through communications with control node 112a and control node 112b, respectively. In an embodiment of the present invention, the water distribution schedule enables water distribution of the particular target water distribution areas through water distribution segments 114. Master computer system 130 may receive flow feedback response information from water distribution zones of water distribution system 110. In another embodiment of the present invention, the flow feedback response information is integrated, transmitted, and/or computed at one or more control nodes 112. In another embodiment of the present invention, the flow feedback response information is integrated, transmitted, and/or computed at one or more gateway computer systems 116. Implementing the latter two embodiments may reduce the computational demand and network bandwidth of master computer system 130 and network 120 when operating and monitoring variable water distribution system 110. For example, as previously discussed, information may propagate to and from control node 112a and control node 112b and send/receive information from gateway computer system 116a to control node 112a.

Water distribution zone 210 depicts a grouping of water distribution segments 114 configured in a series arrangement. Water distribution zone 220 depicts a grouping of water distribution segments 114 configured in a parallel arrangement. In both water distribution zone 210 and water distribution zone 220, a wireless or wired communication network may be implemented. Wireless technologies such as mesh network, ZigBee, WirelessHART, broadcasting technologies, or any other wireless communication technology known in the art may be implemented. Wired technologies such as serial RS-232, serial differential RS-485, power line communication, or any other wired communication technology known in the art may be implemented. In certain embodiments of the present invention, a combination of both wired and wireless communication technologies are implemented.

Figure 3:
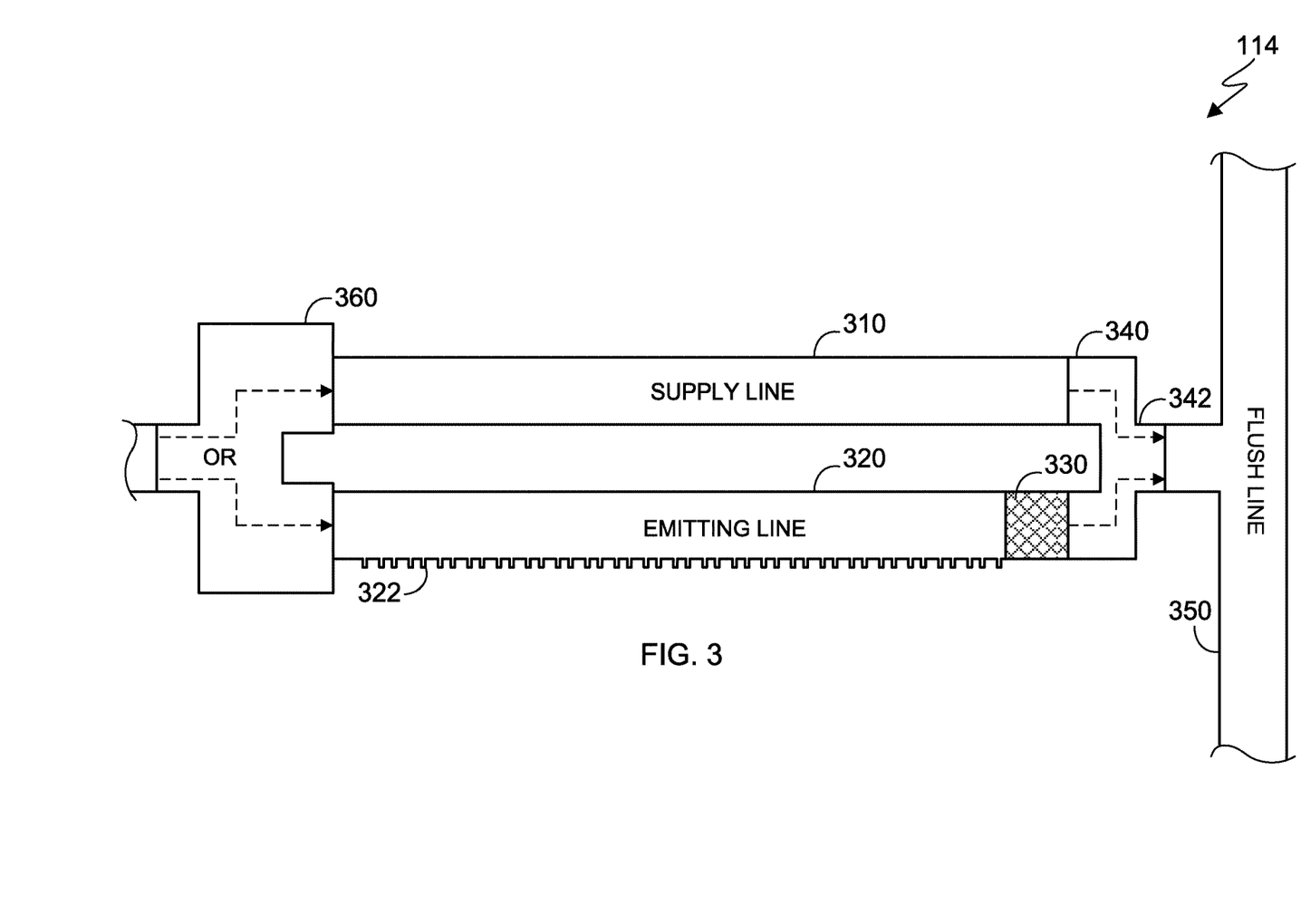
FIG. 3 is a diagram of a water distribution segment, in accordance with an embodiment of the present invention.

FIG. 3 is a diagram illustrating one of water distribution segments 114 and its respective components, in accordance with an embodiment of the present invention. In this embodiment of the present invention, each of water distribution segments 114 comprises supply line 310, emitting line 320, check valve 330, joint element 340, and water distribution valve 360. In this embodiment, water distribution valve 360 is positioned such that each one of water distribution segments 114 delivers water either through emitting line 320 or supply line 310, but does not deliver water through both emitting line 320 and supply line 310. Stated differently, water distribution valve 360 can be regarded as a switch that either activates a water distribution segment 114 (i.e., by directing flow to emitting line 320 of that water distribution segment 114) or deactivates a water distribution segment 114 (i.e., by directing flow to supply line 310 of that water distribution segment 114), as shown in FIG. 3 with dashed arrows separated by "OR".

Supply line 310 and emitting line 320 are conduits (e.g., flexible or rigid tubes, pipes, etc.) capable of transporting liquids between two components within variable water distribution system 110. In this embodiment of the present invention, supply line 310 and emitting line 320 transport liquid from water distribution valve 360 to joint element 340. Furthermore, as previously discussed, if emitting line 320 is delivering water (i.e., water distribution segment 114 is activated), then supply line 310 may not deliver water, and vice-versa. The user specification for the length of supply line 310 and emitting line 320 for one of water distribution segments 114, as well as an arrangement of supply line 310 and emitting line 320 relative to each other, may be based on various factors (i.e., soil properties, crop properties, etc.) as further discussed later in this specification with regard to FIG. 5. In this embodiment, supply line 310 and emitting line 320 are of equal length, and are arranged in parallel with supply line 310 disposed above emitting line 320. Furthermore, a proximal end of supply line 310 is operatively connected to one output of distribution valve 360. In this embodiment, a distal end of supply line 310 is operatively connected to an input of joint element 340.

Emitting line 320 comprises emitters 322 that are merged, connected, or otherwise disposed along the length of emitting line 320. Emitters 322 may comprise, for example, holes, nozzles, sprayers, or any other component that is capable of dispensing liquid (e.g., water and/or fertilizers) to a target water distribution segment. In this embodiment, a proximal end of emitting line 320 is operatively connected to another output of distribution valve 360. Furthermore, a distal end of emitting line 320 is operatively connected to an input of check valve 330.

Check valve 330 is positioned at the end of emitting line 320 to prevent water from flowing back from water distribution valve 360 into supply line 310. Check valve 330 may be implemented with any check valve, clack valve, non-return valve, and/or combinations of any unidirectional valves known in the art valve that permits flow only in one direction. In this embodiment, a proximal end of check valve 330 is operatively connected to a distal end of emitting line 320. Furthermore, a distal end of check valve 330 is operatively connected to another input of joint element 340.

Figure 4A:
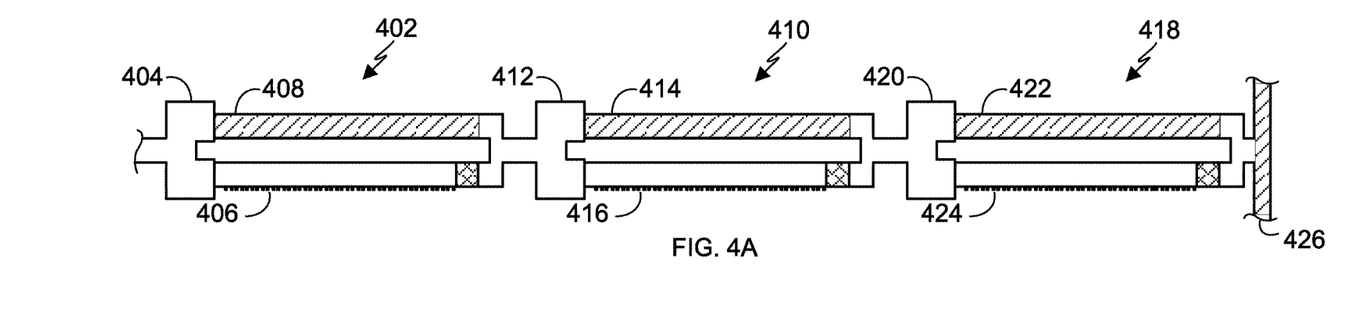
FIGS. 4A-4C are diagrams illustrating a plurality of linked water distribution segments in different operational configurations, in accordance with an embodiment of the present invention.

Joint element 340 is operatively connected to supply line 310 and emitting line 320. In an embodiment of the present invention, output 342 of joint element 340 is operatively connected to an input of flush line 350 that carries flushed liquid. Joint element 340 receives water from supply line 310 and/or emitting line 320 and outputs water to output 342, as shown by dashed arrows in FIG. 3. Although not illustrated in FIG. 3, in another embodiment of the present invention, output 342 of joint element 340 is operatively connected to water distribution valve 360 (i.e., when linking a plurality of water distribution segments 114, as shown in FIG. 4). In general, joint element 340 can be implemented with any device, fixture, or component that is capable of combining water flow from two inputs (e.g., supply line 310 and/or emitting line 320) and allocating the flow through output 342, in accordance with a desired embodiment of the present invention.

Water distribution valve 360 distributes water to supply line 310 or emitting line 320, in accordance with an embodiment of the present invention. Water distribution valve 360 is operatively connected to, and receives actuation instructions from, one of control nodes 112. Water distribution valve 360 comprises to two outputs and one input. In this embodiment, proximal end of supply line 310 is operatively coupled to one output, and a proximal end of emitting line 320 is operatively connected to another output. Furthermore, the input of water distribution valve 360 can be operatively connected to another one of water distribution segments 114 (as shown in FIG. 4), or another liquid input source (e.g., a main water supply line). In this embodiment of the present invention, water distribution valve 360 is a solenoid valve (e.g., a three-way solenoid valve). In general, water distribution valve 360 may be any electro-mechanical valve capable of receiving actuation instructions and distributing the water flow through supply line 310 or emitting line 320.

Figure 4B:
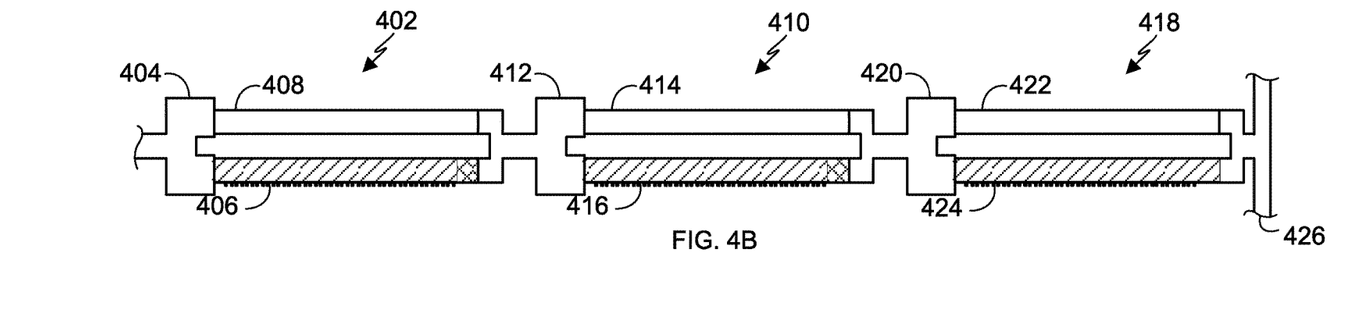
Figure 4C:
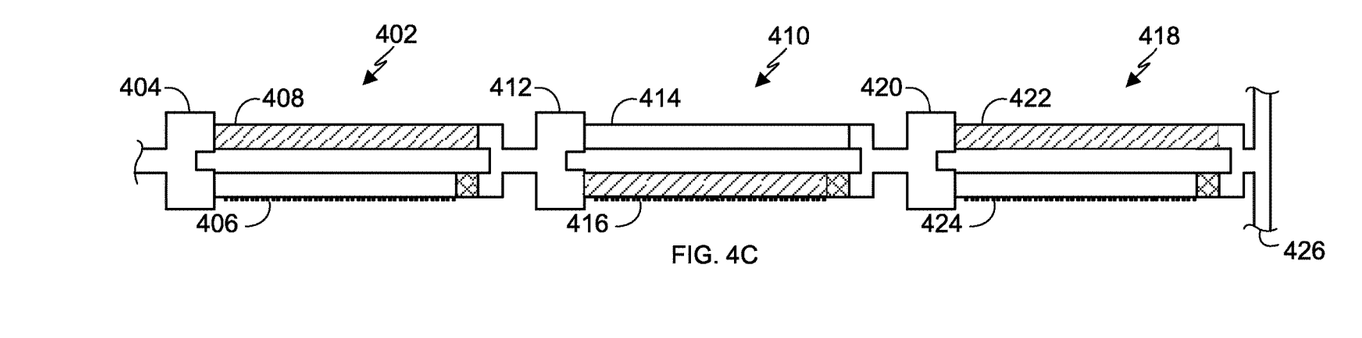

FIGS. 4A-4C illustrates a group of connected water distribution segments in various operational configurations, in accordance with an embodiment of the present invention. In this embodiment, water distribution segments 402, 410, and 418 have the same structure as water distribution segments 114, as earlier described with regard to FIG. 3. For example, each one of water distribution segments 402, 410, and 418 can have corresponding supply lines 408, 414, and 422, as well as corresponding emitting lines 406, 416, and 424, respectively. Furthermore, water distribution valves 404, 412, and 420, and flush line 426 may have the same structure as water distribution valve 360 and flush line 350, respectively, as earlier described with regard to FIG. 3. Accordingly, FIGS. 4A-4C illustrate three configurations for variable water distribution.

FIG. 4A depicts a configuration in which water distribution segments 402, 410, and 418 are not activated (i.e., not currently irrigating the target water distribution areas). In this embodiment of the present invention, water distribution valve 404 diverts water flow from a supply (not depicted) to supply line 408 in water distribution segment 402. For water distribution segment 410, water distribution valve 412 diverts water flow received from water distribution segment 402 to supply line 414. For water distribution segment 418, water distribution valve 420 diverts water flow received from water distribution segment 410 to supply line 422. In this embodiment of the present invention, flush line 426, located at the distal end of water distribution segment 418, is closed such that water cannot exit the series of water distribution segments 402, 410, and 418. Although not depicted, in this embodiment, flush line 426 contains a flush valve which prevents water from exiting variable water distribution system 110 other than from emitters 322 (FIG. 3). In this embodiment of the present invention, a flush valve of flush line 426 is actuated, such that water flows out the end of the last water distribution segment 418 and flushes supply lines 408, 414, and 422 of water distribution segments 402, 410, and 418, accordingly.

FIG. 4B depicts a configuration in which water distribution segments 402, 410, and 418 are activated (i.e., currently irrigating the target water distribution areas). In this embodiment of the present invention, water distribution valve 404 diverts water flow received from a supply (not depicted) to emitting line 406 in water distribution segment 402. For water distribution segment 410, water distribution valve 412 diverts water flow received from water distribution segment 402 to emitting line 416. For water distribution segment 418, water distribution valve 420 diverts water flow received from water distribution segment 410 to emitting line 424. In this embodiment of the present invention, flush valve 426, located at the distal end of water distribution segment 418, is closed such that water cannot exit the series of water distribution segments 402, 410, and 418. In another embodiment of the present invention, a flush valve of flush line 426 is actuated, such that water flows out the end of the last water distribution segment 418 and flushes emitting lines 406, 416, and 424 of water distribution segments 402, 410, and 418, accordingly.

FIG. 4C depicts a configuration in which water distribution segments 402, 410, and 418 are activated. In this embodiment of the present invention, water distribution valve 404 diverts water flow received from a supply (not depicted) to supply line 408 in water distribution segment 402. For water distribution segment 410, water distribution valve 412 diverts water flow received from water distribution segment 402 to emitting line 416. For water distribution segment 418, water distribution valve 420 diverts water flow received from water distribution segment 410 to supply line 422. In this embodiment of the present invention, flush valve 426 located at the distal end of water distribution segment 418 is closed such that water cannot exit the series of water distribution segments 402, 410, and 418. In another embodiment of the present invention, flush valve 426 is actuated, such that water flows out the end of the last water distribution segment 418 and flushes supply lines 408 and 422, and emitting line 416 of water distribution segments 402, 410, and 418, accordingly.

Figure 5:
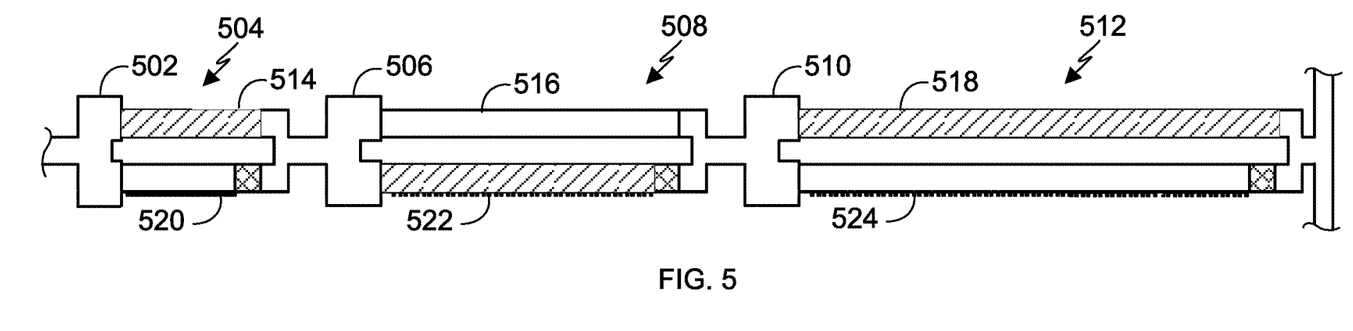
FIG. 5 is a diagram illustrating linked water distribution segments of varying lengths, in accordance with an embodiment of the present invention.

FIG. 5 depicts a series of water distribution segments 504, 508, and 512 with varying segment lengths that are variably irrigating the target water distribution areas, in accordance with an embodiment of the present invention. In this embodiment of the present invention, water distribution segments 504, 508, 512 are water distribution segments 114, as described earlier with regard to FIG. 3. Water distribution valve 502 diverts water flow received from a supply (not depicted) to supply line 514 for water distribution segment 504. For water distribution segment 508, water distribution valve 506 diverts water flow received from water distribution segment 504 to emitting line 522. For water distribution segment 512, water distribution valve 510 diverts water flow received from water distribution segment 508 to supply line 518. In another embodiment of the present invention, an operating user specifies the lengths of water distribution segments 504, 508, and 512 based on a target water distribution area's properties and a resolution for variable rate water distribution desired by the user. For example, the target water distribution area for a water distribution zone can have dynamic soil properties that may change throughout a spatial domain. Variable water distribution system 110 may employ smaller lengths of water distribution segments 114 to increase the resolution of water delivered.

Figure 6:
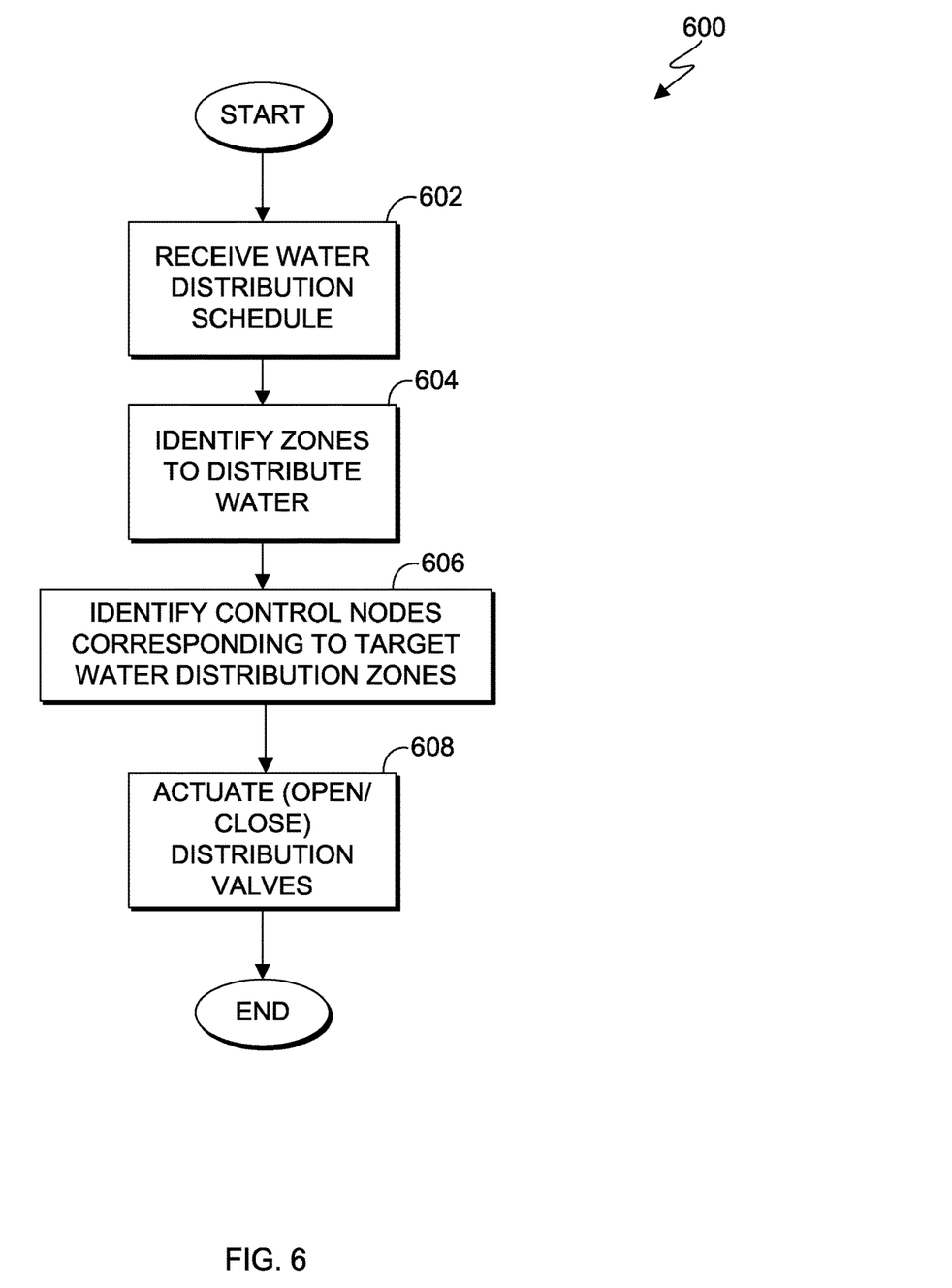
FIG. 6 is a flowchart illustrating operational steps for executing a water distribution schedule, in accordance with an embodiment of the present invention.

FIG. 6 is a method 600 illustrating operational steps for executing a water distribution schedule for variable water distribution system 110, in accordance with embodiments of the present invention.

In step 602, gateway computer systems 116 receive a water distribution schedule from water distribution program 132. In this embodiment, gateway computer systems 116 receive the water distribution schedule via network 120. The water distribution schedule can contain information for distributing water, such as portions of variable water distribution system 110 to deliver water, times and durations of times for delivering water, etc.

In step 604, gateway computer system 116 identifies target water distribution zones in variable water distribution system 110. In this embodiment, gateway computer systems 116 use the water distribution schedule to identify which water distribution zones are target water distribution zones. Furthermore, gateway computer systems 116 can use the water distribution schedule to determine a duration of time to activate each target water distribution zone (i.e., intervals of times to deliver water to target water distribution zones).

In step 606, gateway computer systems 116 identifies control nodes 112 that correspond to each identified target water distribution zone. In this embodiment, each one of control nodes 112 corresponds with one water distribution zone. Furthermore, when a target water distribution zone is identified, all control nodes 112 that correspond to each target water distribution zone are identified. In this embodiment, gateway computer systems 116 transmits information from the water distribution schedule to each one of the identified control nodes 112. The water distribution schedule may comprise one or more instructions that instruct control nodes 112 to actuate (i.e., open or close) respective water distribution valves 360 (FIG. 3) at specified times and for specified durations. The specified times and durations for which water distribution valves 360 are actuated determines the amount of water delivered by the corresponding water distribution segment 114. Any combination of such times and durations can be used (e.g., one or more short pulses of water delivery, one or more long durations of water delivery, etc.). In addition to water requirements of target distribution areas, the water distribution schedule can also be generated in view of concentrations of any additives to the water (e.g., fertilizer) and requirements of target distribution areas for those additives. In another embodiment, gateway computer systems 116 transmits information from the water distribution schedule to one of the identified control nodes 112. Furthermore, one of the identified control nodes 112 can propagate command logic corresponding to the water distribution schedule throughout all subsequent control nodes 112 within the series and/or parallel communication configuration.

In step 608, control nodes 112 actuate (open/close) one or more water distribution valves 360 (FIG. 3), based on the received information from the water distribution schedule. Actuating one or more water distribution valves 360 activates one or more corresponding water distribution segments 114, permitting flow through emitting line 320 (FIG. 3) and irrigates the target water distribution area. For example, in a target water distribution zone comprising ten water distribution segments 114, eight water distribution segments 114 may be activated by actuating water distribution valves 360 during operation of variable water distribution system 110.

Figure 7:
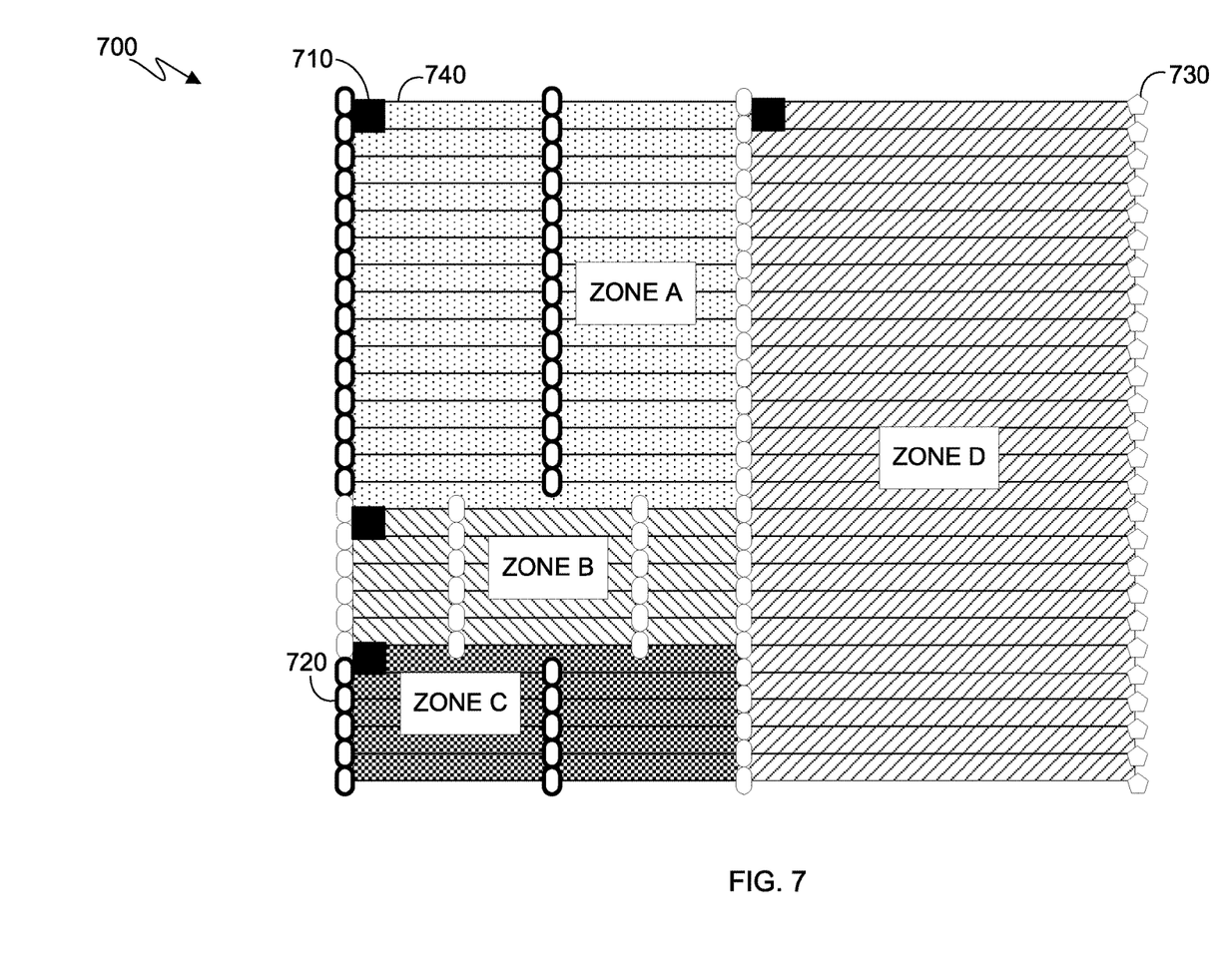
FIG. 7 is a diagram illustrating a plurality of water distribution zones, in accordance with an embodiment of the present invention.

FIG. 7 presents a diagram 700 illustrating several water distribution zones in a variable rate water distribution system 110. The diagram 700 comprises water distribution segments 740 operatively connected to control nodes 710, water distribution valves 720 and flush valves 730, in accordance with an embodiment of the present invention. This example includes zones A-D, with specific water distribution requirements, varying zone sizes, and varying water distribution segment 740 lengths. In this embodiment, zones A-D are water distribution zones.

Gateway computer systems 116 may identify zone A and zone C as target water distribution zones based on a water distribution schedule (step 604, FIG. 6). Subsequently, gateway computer systems 116 identifies control nodes 710 that correspond to zone A and zone C (step 606, FIG. 6).

In one embodiment, gateway computer systems 116 transmit information from the water distribution schedule (i.e., instructions for actuating or command logic) to each of the control nodes 710 that correspond to zone A and zone C. In another embodiment, gateway computer systems transmit information from the water distribution schedule to one of the identified control nodes 710 that corresponds to zone A. Furthermore, command logic corresponding to the water distribution schedule may propagate such that one of control nodes 710 in zone A transmits the command logic to one of control nodes 710 in zone B. Subsequently, one of control nodes 710 in zone C receives command logic from one of control nodes 710 in zone B, and then one of control nodes 710 in zone D receives command logic from one of control nodes 710 in zone C (step 608, FIG. 6). The command logic received by the respective control nodes 710 provides instructions to actuate water distribution valves 720, resulting in activating water distribution segments 740. For illustrative purposes, water distribution valves 720 that correspond to zone A and zone C are bolded. Accordingly, zone A and zone C are activated target water distribution zones and contain activated water distribution segments 740. It should be understood that control nodes 112 of zone A and zone C may receive separate command logic that is specific to the respective water distribution zone, such that water distribution segments 740 in zone A are activated independently of water distribution segments 740 in zone C.

In another embodiment, gateway computer systems 116 transmit information from a flushing schedule to each of the control nodes 710 that correspond to target water distribution zones identified for flushing. For example, zone D may be identified as a water distribution zone to be flushed. Accordingly, flush valves 730 and water distribution valves 720 that correspond to zone D are actuated to flush water distribution segments 710 that correspond to zone D, as discussed in greater detail with regard to FIG. 8. In another example, zone A and zone D may be identified as water distribution zones to be flushed. In this instance, flush valves 730 that correspond to zone D and water distribution valves 720 that correspond to zone A and zone D are actuated. Accordingly, water distribution segments 710 that correspond to zone A and zone D are flushed. Although not depicted, flush valves 730 may be disposed at distal ends of each zone (e.g., zone A, zone B, and zone C). Accordingly, zone A, zone B, zone C, and zone D, and components therein, can receive information to flush each water distribution zone independently of one another.

Figure 8:
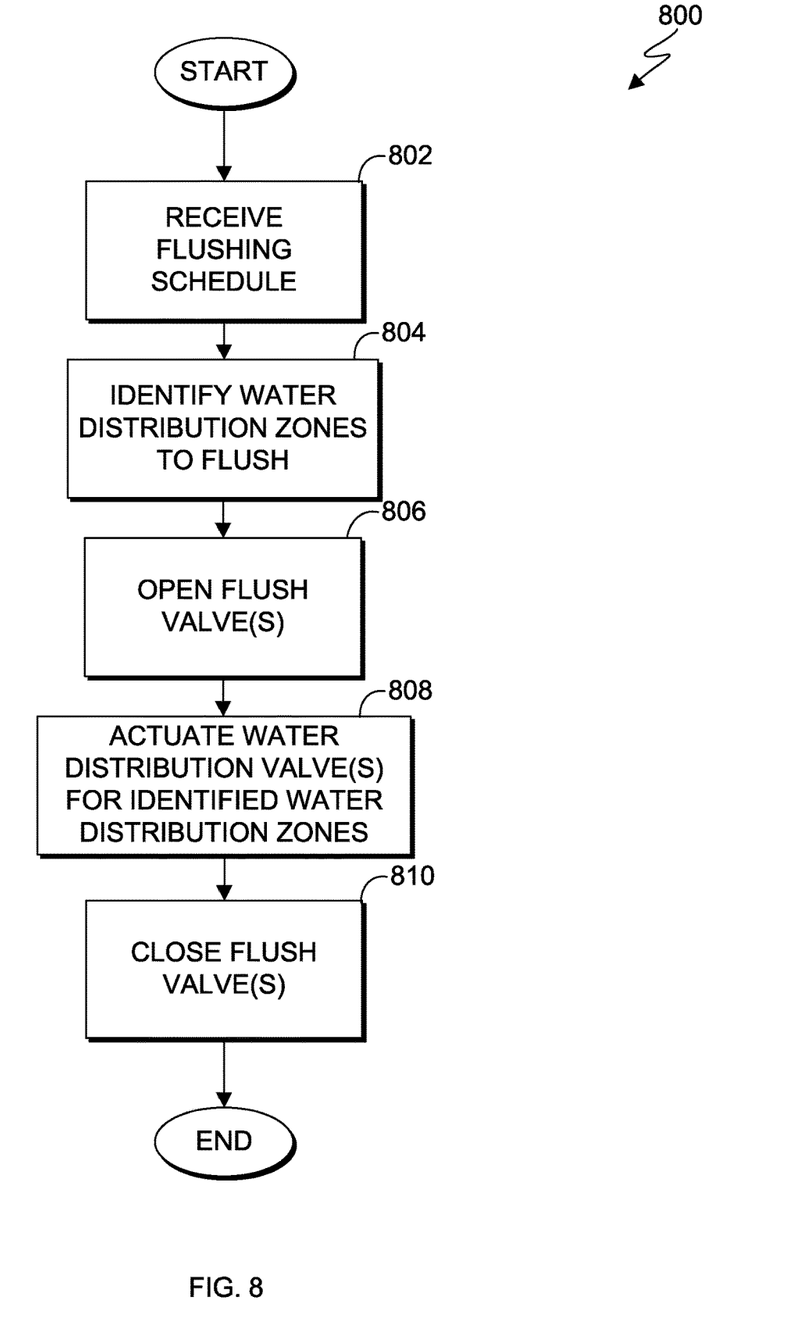
FIG. 8 is a flowchart illustrating operational steps for executing a flushing operation, in accordance with an embodiment of the present invention.

FIG. 8 is a flowchart 800 illustrating operational steps for flushing water distribution segments 114 for variable water distribution system 110, in accordance with an embodiment of the present invention.

In step 802, gateway computer systems 116 receive a flushing schedule from water distribution program 132. In this embodiment, gateway computer systems 116 receive the flushing schedule via network 120. The flushing schedule can contain information for flushing operations, such as portions of variable water distribution system 110 to flush, times and durations of times for flushing, etc.

In step 804, gateway computer systems 116 identifies water distribution zones in variable water distribution system 110 to flush. In this embodiment, gateway computer systems 116 use the flushing schedule to identify the water distribution zones. Furthermore, gateway computer systems 116 can use the flushing schedule to determine a duration of time to flush each target water distribution zone (i.e., intervals of times to flush target water distribution zones). In other embodiments, a method for active determination may be employed to identify water distribution zones that require flushing. The method may comprise, utilizing pressure sensors, flow sensors, or any other monitoring device that can detect foreign material (e.g., sand, rocks, etc.) within the system, identify water distribution zones which requires flushing and relay pertinent information to control nodes 112. Furthermore, gateway computer systems 116 transmits information from the flushing schedule (e.g., command logic for water distribution valves 360 (FIG. 3) and flush valves for flush lines 350 (FIG. 3)) to control nodes 112.

In step 806, control nodes 112 open one or more flush valves for identified water distribution zones. In this embodiment, control nodes 112 that actuate (i.e., open) flush valves for identified water distribution zones enable water to flow out of variable water distribution system 110 in identified water distribution zones.

In step 808, one or more water distribution valves 360 are actuated (open/close) by one or more control nodes 112 that correspond to the identified water distribution zones. In this embodiment of the present invention, the actuation of one or more water distribution valves 360 (FIG. 3) facilitates the flushing operation such that water flows through its supply line rather than its emitter line. In another embodiment, the actuation is performed sequentially such that the emitting line and supply line of each one of water distribution segments 114 are effectively flushed.

In step 810, control nodes 112 signal the one or more flush valves to close at the end of the flushing operation, in accordance with an embodiment of the present invention.

Figure 9:
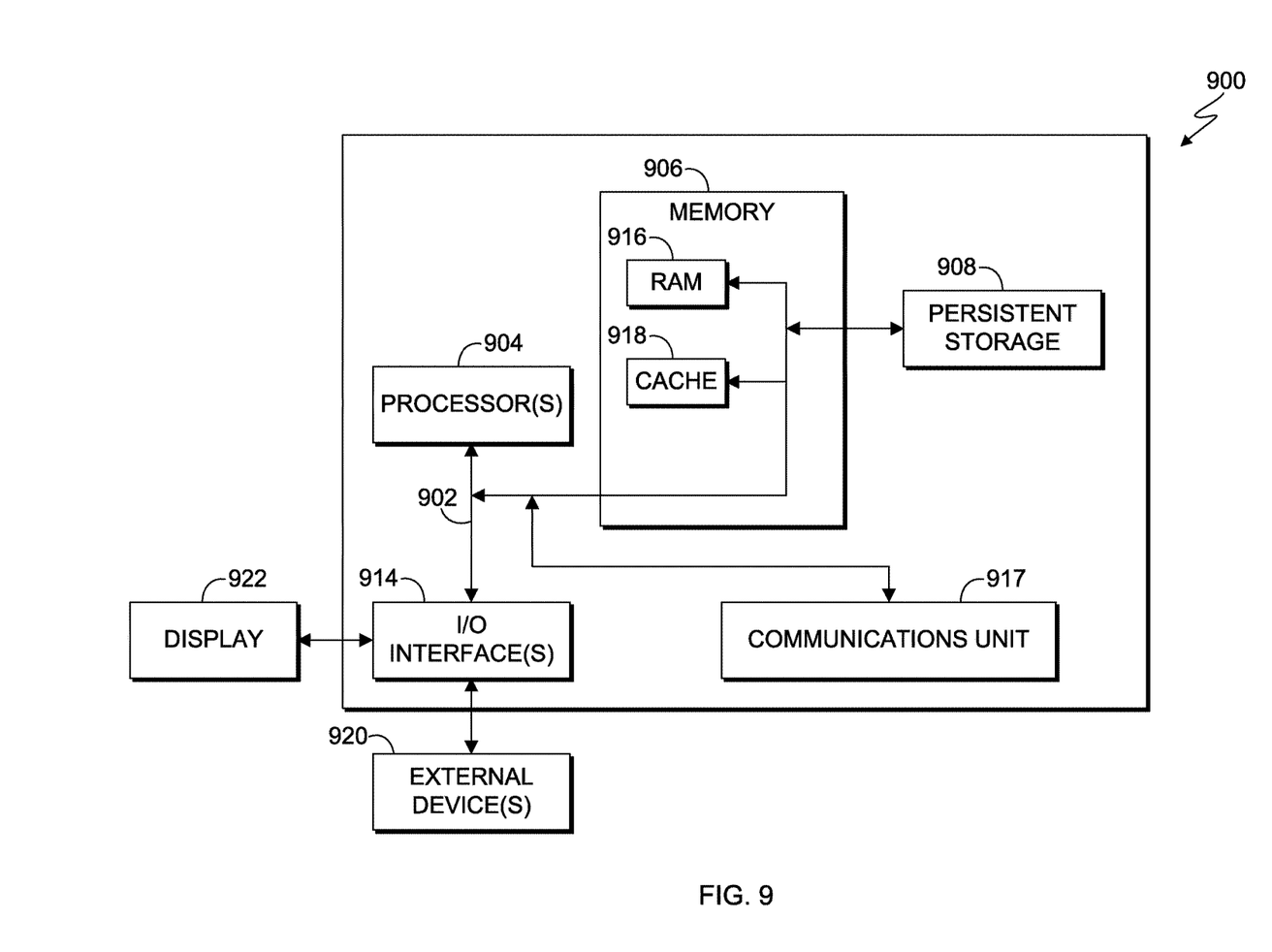
FIG. 9 is a block diagram of internal and external components of the computer systems of FIG. 1, in accordance with an embodiment of the present invention.

FIG. 9 is a block diagram of internal and external components of a computer system 900, which is representative the computer systems of FIG. 1, in accordance with an embodiment of the present invention. It should be appreciated that FIG. 9 provides only an illustration of one implementation and does not imply any limitations with regard to the environments in which different embodiments may be implemented. In general, the components illustrated in FIG. 9 are representative of any electronic device capable of executing machine-readable program instructions. Examples of computer systems, environments, and/or configurations that may be represented by the components illustrated in FIG. 9 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 900 includes communications fabric 902, which provides for communications between one or more processors 904, memory 906, persistent storage 908, communications unit 917, and one or more input/output (I/O) interfaces 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media. Software is stored in persistent storage 908 for execution and/or access by one or more of the respective processors 904 via one or more memories of memory 906.

Persistent storage 908 may include, for example, a plurality of magnetic hard disk drives. Alternatively, or in addition to magnetic hard disk drives, persistent storage 908 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 917 provides for communications with other computer systems or devices via a network (e.g., network 120). In this embodiment, communications unit 917 includes network adapters or interfaces such as a TCP/IP adapter cards, wireless Wi-Fi interface cards, or 3G or 4G wireless interface cards, or other wired or wireless communication links. The network can comprise, for example, copper wires, optical fibers, wireless transmission, routers, firewalls, switches, gateway computers, and/or edge servers. Software and data used to practice embodiments of the present invention can be downloaded through communications unit 917 (e.g., via the Internet, a local area network or other wide area network). From communications unit 917, the software and data can be loaded onto persistent storage 908.

One or more I/O interfaces 914 allow for input and output of data with other devices that may be connected to computer system 900. For example, I/O interface 914 can provide a connection to one or more external devices 920, such as a keyboard, computer mouse, touch screen, virtual keyboard, touch pad, pointing device, or other human interface devices. External devices 920 can also include portable computer-readable storage media such as, for example, thumb drives, portable optical or magnetic disks, and memory cards. I/O interface 914 also connects to display 922.

Display 922 provides a mechanism to display data to a user and can be, for example, a computer monitor. Display 922 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A distribution system, comprising:
a plurality of distribution segments coupled to each other, each distribution segment comprising:
a supply line having a proximal end and a distal end;
an emitting line having a proximal end and a distal end, wherein the emitting line includes a plurality of emitters disposed therein, and wherein the distal end of the emitting line is operatively coupled to a check valve configured to prevent liquid flow from a joint element to the emitting line;
a distribution valve comprising one input and two outputs, wherein one output of the distribution valve is operatively coupled to the proximal end of the supply line, and wherein one output of the distribution valve is operatively coupled to the proximal end of the emitting line, and wherein the distribution valve is configured to divert liquid flow through either the supply line or the emitting line;
the joint element comprising two inputs and one output, wherein one input of the joint element is coupled to the distal end of the supply line, and wherein one input of the joint element is coupled to the check valve;

a first distribution segment of the plurality of distribution segments operatively coupled to a second distribution segment of the plurality of distribution segments, wherein the output of the joint element of the first distribution segment is operatively coupled to the input of the distribution valve of the second distribution segment;

a sensor operatively connected to the first distribution segment and the second distribution segments, wherein the sensor is configured to monitor flow feedback information for the first distribution segment and the second distribution segments; and a master computer system configured to execute a distribution schedule based on the flow feedback information monitored by the sensor, wherein the distribution valve of the first segment diverts liquid flow either through the supply line or the emitting line of the first distribution segment independent of liquid flow in the second distribution segment, and wherein the distribution valve of the second segment diverts liquid flow either through the supply line or emitting line of the second distribution segment independent of liquid flow in the first distribution segment, in accordance with the distribution schedule.

2. The system of claim 1, wherein the input of the distribution valve of each distribution segment is coupled to either a liquid supply source or the output of a joint element of another distribution segment.

3. The system of claim 2, wherein the output of the joint element of each distribution segment is coupled to either the input of the distribution valve of another distribution segment or an input of a flush valve.

4. The system of claim 1, further comprising:
a plurality of control nodes, wherein each control node is operatively connected to a distribution valve to control whether the distribution valve diverts liquid through the supply line or the emitting line to which the distribution valve is coupled, and wherein the plurality of control nodes receive flow feedback information from the sensor.

5. The system of claim 4, further comprising:
a plurality of gateway computer systems, wherein each gateway computer system is operatively connected to a control node to transmit instructions for actuating one or more distribution valves to which the control node is operatively connected.

6. The system of claim 1, wherein the distribution schedule comprises one or more instructions that instruct each of a plurality of control nodes to actuate one or more distribution valves at one or more specified times and for one or more specified durations.

7. The system of claim 1, wherein each distribution segment is configured to be independently activated or deactivated according to the distribution schedule.

8. A distribution system, comprising:
a plurality of distribution segments coupled to each other, each distribution segment configured to be independently activated or deactivated to deliver liquid to a target distribution area, each distribution segment comprising:
a supply line;
an emitting line having a plurality of emitters disposed therein;
a distribution valve configured to direct flow of liquid to the supply line or the emitting line;
a joint element configured to output liquid received from the emitting line or the supply line;
a first distribution segment of the plurality of distribution segments operatively coupled to a second distribution segment of the plurality of distribution segments, wherein the output of the joint element of the first distribution segment is operatively coupled to the input of the distribution valve of the second distribution segment;
a sensor configured to monitor flow feedback information for the target distribution area wherein the sensor is operatively connected to the first distribution segment and the second distribution segment; and
a master computer system configured to execute a distribution schedule based on the flow feedback information monitored by the sensor, wherein the distribution valve of the first segment diverts liquid flow either through the supply line or the emitting line of the first distribution segment independent of liquid flow in the second distribution segment, and wherein the distribution valve of the second segment diverts liquid flow either through the supply line or emitting line of the second distribution segment independent of liquid flow in the first distribution segment, in accordance with the distribution schedule.

9. The system of claim 8, wherein an input of the distribution valve of each distribution segment is coupled to either a liquid supply source or an output of a joint element of another distribution segment.

10. The system of claim 9, wherein the output of the joint element of each distribution segment is coupled to either the input of the distribution valve of another distribution segment or an input of a flush valve.

11. The system of claim 8, wherein each distribution segment further comprises:
a check valve disposed between the emitting line and an input of the joint element.

12. The system of claim 8, further comprising:
a plurality of control nodes, wherein each control node is operatively connected to a distribution valve to control whether the distribution valve diverts liquid through the supply line or the emitting line to which the distribution valve is coupled.

13. The system of claim 12, further comprising:
a plurality of gateway computer systems, wherein each gateway computer system is operatively connected to a control node to transmit instructions for actuating one or more distribution valves to which the control node is operatively connected.

14. The system of claim 8, wherein the distribution schedule comprises one or more instructions that instruct each of a plurality of control nodes to actuate one or more distribution valves at one or more specified times and for one or more specified durations.

* * * * *